United States Patent [19]

Patton et al.

[11] Patent Number: 5,182,046

[45] Date of Patent: Jan. 26, 1993

[54] SODIUM BOROHYDRIDE COMPOSITION AND IMPROVED METHOD OF PRODUCING COMPACTED SODIUM BOROHYDRIDE

[75] Inventors: Richard A. Patton, Danvers; Walter A. Richardson, Beverly, both of Mass.

[73] Assignee: Morton International, Inc., Chicago, Ill.

[21] Appl. No.: 622,697

[22] Filed: Dec. 5, 1990

[51] Int. Cl.$^5$ .......................... C01B 6/04; C01B 35/10
[52] U.S. Cl. .......................... 252/188.26; 252/188.1; 252/188.22; 252/385; 423/283; 423/267
[58] Field of Search ................ 252/188.1, 188.26, 381, 252/385; 423/283, 286, 289, 294

[56] References Cited

U.S. PATENT DOCUMENTS

| | | | |
|---|---|---|---|
| 2,513,997 | 7/1950 | Gibb, Jr. | 252/188.26 |
| 2,664,357 | 12/1953 | Miller | 252/381 |
| 2,705,206 | 3/1955 | Wagner | 252/188.26 |
| 2,963,405 | 12/1960 | Seemuller | 252/188.26 |
| 3,830,738 | 8/1974 | Cottrell | 252/381 |
| 4,403,045 | 9/1983 | Wade | 264/DIG. 5 |
| 4,915,853 | 4/1990 | Yamaguchi | 252/381 |

*Primary Examiner*—Richard D. Lovering
*Assistant Examiner*—Joseph D. Anthony
*Attorney, Agent, or Firm*—Wayne E. Nacker; Gerald K. White

[57] ABSTRACT

Improved sodium borohydride powder compositions have a silica-based anticaking agent. In a method wherein a mixture of sodium borohydride and an anticaking agent are compacted under pressure, the process is improved, particularly in speed, by the use of a silica-based anti-caking agent.

13 Claims, No Drawings

SODIUM BOROHYDRIDE COMPOSITION AND IMPROVED METHOD OF PRODUCING COMPACTED SODIUM BOROHYDRIDE

The present invention is directed to sodium borohydride compositions in powder form which provide improved free-flow and to sodium borohydride compositions which exhibit reduced turbidity when dissolved in aqueous media. The present invention is also directed to an improved method of producing compacted sodium borohydride.

BACKGROUND OF THE INVENTION

Sodium borohydride ($NaBH_4$) is a potent reducing agent useful in a variety of applications, including production of dithionite for pulp bleaching and recovery of heavy metals from waste streams.

Dry sodium borohydride (referred to as "SBH") is typically produced as a powder having particle sizes of between about 30 and 100 microns and is used in many applications as a powder. To promote free-flow of SBH powder, it is known to admix SBH powder with an anticaking agent (referred to as "ACA"). The most widely used anticaking agent has been magnesium carbonate-based products (referred to as "mag carb"). When making SBH aqueous or nonaqueous solutions with magnesium carbonate-containing formulations, there is often a problem with turbidity, presumably because of inability of the magnesium carbonate to dissolve.

There exists a need for powdered sodium borohydride compositions which exhibit reduced turbidity when dissolved in aqueous media.

SUMMARY OF THE INVENTION

In accordance with the present invention, sodium borohydride powder is admixed with an anticaking agent which is silica based. The silica-based anticaking agent provides improved free-flow of powdered sodium borohydride relative to magnesium carbonate-based anticaking agent. When dissolved in an aqueous medium, sodium borohydride that has been formulated with a silica based-anticaking agent exhibits substantially reduced turbidity.

In accordance with another aspect of the present invention, in a process in which powdered sodium borohydride is admixed with a fine powder of an anticaking agent and then compacted under pressure, significantly improved production rates are achieved when a silica-based anticaking agent is used.

DETAILED DESCRIPTION OF CERTAIN PREFERRED EMBODIMENTS

Powdered sodium borohydride generally has particle sizes in the range of between about 30 and about 100 micrometers.

By silica-based anti-caking agent is meant powders of particle size between about 1 and about 20 nanometers and containing at least about 90 weight percent, preferably 95 weight percent, silicon dioxide. The anticaking agent may be fine silica powder obtained by any one of several processes (e.g., fumed silica or precipitated silica). Alternatively, silica powders coated with a hydrophobic substance, such as a silane, a silicon oil, a hydrocarbon oil, chlorinated hydrocarbon oil, or mixtures thereof may be used. Such coated silicas are sold, for example, by Cabot Corp. and by Degussa Corp.

The silica-based anticaking agent is used at a level of between about 0.05 and about 2 wt percent relative to the sodium borohydride, preferably in the range of about 0.1 and about 1 wt percent.

To produce a free-flowing composition, SBH and the silica-based anticaking agent are thoroughly blended, e.g., using a ribbon blender.

Another form in which SBH is often marketed is compacted bodies which may take the form of pellets, caplets or granules. In the terminology of compacted SBH products, pellets are those produced by compaction in individual dies on a rotating plate feed and tend to be relatively large, e.g., cylinders 25 mm in diameter, 6 mm height. Briquette forms (termed "caplets") are produced by compaction between continuous roller presses that provide appropriate indentations for formation of the compacted product. The roller press approach produces compacted products more efficiently than the rotating die method. Caplets are generally considerably smaller than pellets, one typical caplet is 17 mm long$\times$11 mm wide with a thickness of 5 mm. Granules are fragmented pellets or caplets, more generally fragmented caplets, and are typically size-sorted with screens according to use requirements. Compaction pressures for forming either pellets or caplets are typically in the range of between about 350 and 700 $kg/cm^2$.

Compacted SBH's have the advantage over powdered SBH of reducing dust. Larger compacted products are inherently easier to handle than powder. Importantly, in processes wherein solvent is passed through a bed of SBH, compacted products lend themselves to bed formation much more readily than do powders. (It may become nearly impossible to pass solvent through powder which becomes compacted, whereas a bed of pellets, caplets or granules provides openings through which solvent may pass.)

Compacted SBH was initially made from pure SBH powder. It has been found, however, that the use of an anticaking agent is advantageous in producing compacted SBH, particularly in the continuous feed processes, such as those utilized in producing caplets, as free flow of the SBH enhances production rates. In accordance with the invention, it is now found that SBH with silica-based anticaking agent can be compacted at a much higher production rate than SBH with a magnesium carbonate-based anticaking agent.

The invention will now be described in greater detail with reference to specific examples.

EXAMPLE 1

COMPARISON OF FLOW AND TURBIDITY OF SODIUM BOROHYDRIDE WITH MAGNESIUM CARBONATE-BASED ANTICAKING AGENT AND SILICA-BASED ANTICAKING AGENT

Sodium borohydride was formulated with a magnesium carbonate based anticaking agent (Merck's Magcarb® L and silica based anticaking agent (Cabot's Cab-O-Sil® EH-5). The compositions, turbidity characteristics and flow characteristics, are shown below. (Total composition as listed is less than 100%; the balance is minor impurities, such as sodium borate, which sodium borohydride typically contains.)

|  | SBH with MagCarb L | SBH with Cab-O-Sil EH-5 |
|---|---|---|
| % NaBH$_4$ | 97.3 | 97.8 |
| % Anticaking agent | 1.3 | 0.87 |
| Flowability | 22.1 | 2.3 |
| Angle of repose | 48.4 | 34.4 |
| Turbidity, NTU* | 91 | 10 |

*Turbidity of 4% solution in 4% sodium hydroxide

It can be seen that lower levels of the silica-based anticaking agent result in a better flow than greater amounts of magnesium carbonate-based anticaking agent. Also, the turbidity of a sodium borohydride solution in sodium hydroxide is almost eliminated.

EXAMPLE 2

COMPARISON OF PRODUCTION RATES VIA THE BOLLER PRESS METHOD OF SODIUM BOROHYDRIDE CONTAINING 0.5% ANTICAKING AGENT

Equipment: Commercial Roller Press Compactor

| Anticaking Agent | Briquette ("caplet") Production Rate |
|---|---|
| Magnesium Carbonate Based | 90–140 kg/h/unit |
| Silica-Based | 225–280 kg/h/unit$^a$ |

$^a$Improved flow noted: less manual agitation required; less equipment damages.

EXAMPLE 3

Compositions were prepared containing 99.5% by weight SBH and 0.5% by weight anticaking agent. Flowability was tested initially and weekly. The results are as shown below.

Sample Size: Approximately 50 g stored in constant temperature and humidity room (20° C./64% relative humidity).

| Anticaking Agent Type/Specific | Funnel Number Flowability Rating$^a$ After Storage (Weeks) | | | | | Comments on Particle Size at 4 Weeks |
|---|---|---|---|---|---|---|
|  | 0 | 1 | 2 | 3 | 4 |  |
| Silica/Aerosil ® R972 | 3 | 3 | 3 | 3 | 3 | Very good small particle uniformity |
| Silica/Sipernet ® D-11 | 3 | 3 | 3 | 3 | 3$^T$ | Good small particle uniformity |
| Silica/Cab-O-Sil ® TS-530 | 3 | 3 | 3 | 3 | 3$^T$ | Moderate good small particle size |
| Silica/Cab-O-Sil EH-5 | 3 | 3 | 3 | 3$^T$ | 4$^T$ | Some large lumps throughout |
| Silica/Cab-O-Sil TS-610 | 3 | 3 | 3 | 3 | 5 | Some large lumps throughout |
| Mag Carb/ Elastocarb ® UF | 5 | 5 | 5 | 5$^T$ | 6 | Some large lumps throughout |
| Mag Carb/ Elastocarb Tech Light | 5$^T$ | 5$^T$ | 5$^T$ | 5$^T$ | 6 | Many large lumps throughout |
| Magcarb ® L | 5$^T$ | 5$^T$ | 5$^T$ | 5$^T$ | 6 | Many large lumps throughout |

$^a$Ratings are based on the ability of the powder blend to flow through standard cylindrical funnels with various sized orifices. The funnels have an inner diameter of 42 mm and a height of 90 mm.
Aerosil ® and Sipernat ® are registered trademarks of Degussa Corp; Cab-O-Sil ® is a trademark of Cabot Corp.; Elastocarb ® is a trademark of Morton International, Inc.; and Magcarb ® is a trademark of Merck Inc.

| Funnel-No. Rating | Orifice (mm) | Rating of Flowability (Powder Still Running through Freely) |
|---|---|---|
| 1 | 2.5 | Very Good (rarely found in powder) |
| 2 | 5 | Good |
| 3 | 8 | Good, on the whole |
| 4 | 12 | Acceptable |
| 5 | 18 | Poor |
| 6 |  | Insufficient (does not run through funnel 5) |

T-Tapping required (initially and 2-3 times during test) for complete flow.

EXAMPLE 4

Compositions were formulated containing 99.5% by weight SBH and 0.5% by weight anticaking agent. Aqueous solutions (preadjusted to pH 12 with sodium hydroxide) of 0.1% SBH and 1.0% SBH were prepared, and turbidity was measured. The results are as follows:

| Specific Anticaking Agent | Type of Anticaking Agent | Turbidity$^1$ (NTU) | | | |
|---|---|---|---|---|---|
|  |  | 0.1% NaBH$_4$ | Relative Rank | 1.0% NaBH$_4$ | Relative Rank |
| None | (Sodium) Borohydride Only) | 1.7 | 3 | 3.4 | 1 |
| Magcarb ® | Mag Carb | 3.6 | 9 | 21.1 | 9 |
| Elastocarb ® UF | Mag Carb | 3.05 | 7 | 15.1 | 7 |
| Elastocarb Tech light | Mag Carb | 3.1 | 8 | 17.5 | 8 |
| Sipernate ® D-11 | Hydrophobic coated, precipitated silica | 3.0 | 6 | 6.5 | 5 |
| Aerosil ® R 972 | Hydropobic coated, fumed silica | 1.9 | 5 | 4.1 | 2 |
| Cab-O-Sil ® EH-5 | Fumed silica | 1.4 | 1 | 6.0 | 3 |
| Cab-O-Sil ® TS-530 | Hydrophobic coating fumed silica | 1.75 | 4 | 6.3 | 4 |
| Cab-O-Sil ® TS-610 | Hydrophobic coated, fumed silica | 1.5 | 2 | 9.0 | 6 |
| ph 12 H$_2$O soln only | No sodium borohydride | 0.23 |  |  |  |

Some preliminary results indicate that sodium borohydride with silica-based anticaking agent also produces good turbidity results in a number of organic solvents, such as 1-hexanol; as good or even better than using magnesium carbonate-based anticaking agent.

While the invention has been described in terms of certain preferred embodiments, modifications obvious to one with ordinary skill in the art may be made without departing from the scope of the present invention.

Various features of the invention are set forth in the following claims.

What is claimed is:

1. A composition consisting essentially of sodium borohydride and a silica-based anticaking agent comprising at least about 90 percent by weight silica at a level of between about 0.05 and about 2 weight percent relative to the sodium borohydride.

2. A composition according to claim 1 wherein said silica is a fumed silica.

3. A composition according to claim 1 wherein said silica is a precipitated silica.

4. A composition according to claim 1 wherein said anticaking agent is used at a level of between about 0.1 and about 1 weight percent relative to the sodium borohydride.

5. A composition according to claim 1 wherein said sodium borohydride has particle sizes of between about 30 and about 100 micrometers.

6. A composition according to claim 1 wherein said silica-based anticaking agent has particle sizes between about 1 and about 20 nanometers.

7. A composition according to claim 1 wherein said anticaking agent comprises as a balance a coating of hydrophobic material.

8. A composition according to claim 7 wherein said hydrophobic material is selected from the group consisting of silane, silicon oil, hydrocarbon oil, chlorinated hydrocarbon oil and mixtures thereof.

9. A compacted composition according to claim 1.

10. In a method of producing compacted sodium borohydride comprising admixing a composition consisting essentially of powdered sodium borohydride with powdered anticaking agent and compacting said mixture under pressure, the improvement comprising said anticaking agent being at least about 90% by weight silica and used at a level of between about 0.05 and about 2 weight percent relative to the sodium borohydride, whereby substantially enhanced production rates are achieved.

11. A method according to claim 10 wherein said silica is coated with a hydrophobic coating.

12. A method according to claim 10 wherein said mixture is compacted between patterned rollers.

13. A method according to claim 10 wherein said mixture is compacted in dies.

* * * * *